US007552461B2

(12) United States Patent
Okamoto

(10) Patent No.: US 7,552,461 B2

(45) Date of Patent: Jun. 23, 2009

(54) ANTENNA SYSTEM AND TELEVISION RECEIVER

(75) Inventor: Kenji Okamoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 363 days.

(21) Appl. No.: 11/645,686

(22) Filed: Dec. 27, 2006

(65) Prior Publication Data

US 2007/0150923 A1 Jun. 28, 2007

(30) Foreign Application Priority Data

Dec. 28, 2005 (JP) ............................ 2005-377315

(51) Int. Cl.
*H04N 7/20* (2006.01)

(52) U.S. Cl. ........................................................ 725/72

(58) Field of Classification Search .................... 725/72
See application file for complete search history.

(56) References Cited

U.S. PATENT DOCUMENTS

| | | | | |
|---|---|---|---|---|
| 6,867,919 | B2 * | 3/2005 | Seyfried | 359/618 |
| 7,136,113 | B2 * | 11/2006 | Lee | 348/725 |
| 7,242,424 | B2 * | 7/2007 | Lee | 348/180 |
| 7,408,593 | B2 * | 8/2008 | Narita | 348/725 |
| 2004/0248517 | A1 * | 12/2004 | Reichgott et al. | 455/63.4 |
| 2005/0257237 | A1 * | 11/2005 | Yamamoto | 725/72 |

FOREIGN PATENT DOCUMENTS

| | | |
|---|---|---|
| JP | 2005-217848 A | 8/2005 |
| JP | 2005-217849 A | 8/2005 |

* cited by examiner

*Primary Examiner*—Christopher Kelley
*Assistant Examiner*—Mulugeta Mengesha
(74) *Attorney, Agent, or Firm*—Crowell & Moring LLP

(57) ABSTRACT

An object is to provide antenna system capable to decide optimal receiving direction of antenna, and television receiver provided with such antenna system.

The antenna system includes CPU that executes switching program to switch directional property of antenna sequentially, CPU that executes determination program to determine whether TV broadcast signal is received or not each time directional property of antenna is switched, CPU that executes decision program to decide direction of directional property of the antenna when it is determined that TV broadcast signal was received, as optimal receiving direction that corresponds to one channel, and number of decision times data table to store receiving direction decided as optimal receiving direction and number of decision times receiving direction was decided as optimal receiving direction in correspondence with each other. Directional property of antenna is switched sequentially from receiving direction that has larger number of decision times.

2 Claims, 5 Drawing Sheets

191

| CHANNEL[ch] (191a) | OPTIMAL RECEIVING DIRECTION (191b) |
|---|---|
| 2 | a |
| ⋮ | ⋮ |
| 69 | g |

192

| RECEIVING DIRECTION (192a) | NUMBER OF DECISION TIMES [TIMES] (192b) |
|---|---|
| a | 10 |
| ⋮ | ⋮ |
| p | 8 |

ANTENNA SYSTEM AND TELEVISION RECEIVER

BACKGROUND OF THE INVENTION

1. Field of the Invention

The present invention relates to an antenna system and a television receiver.

2. Description of the Related Art

Conventionally, an antenna that is capable to switch directional property (what is called "smart antenna") when receiving a television broadcast signal (hereinafter referred to as "TV broadcast signal"), has been known.

Specifically, such antenna is capable to switch the directional property by control from an antenna system (receiving apparatus) in accordance with a predetermined standard such as EIA/CEA-909 or the like, for example.

An antenna system including such antenna decides optimal receiving direction of the antenna for each channel at initial settings. Then, in a case where a desired channel is assigned by a user during ordinary operation, the antenna system switches directional property of antenna to an optimal receiving direction that corresponds to the desired channel which is decided at initial settings, and receives TV broadcast signal that corresponds to the desired channel.

Concerning the antenna system as afore-mentioned, in order to receive TV broadcast signal with high quality, an antenna system that extracts a preferable directional property in which quality of received signal of the TV broadcast signal received by the antenna is not less than a threshold value during ordinary operation, and switches directional property of the antenna to the preferable directional property which is extracted (For example, refer to Japanese Patent Specification (Laid Open) No. 2005-217848), has been suggested.

Further, concerning an antenna system that has a plurality of antennas that are not capable to switch directional property, in order to receive TV broadcast signal with high quality, an antenna system that switches to other preferable antenna so that the quality of received signal is not less than the threshold value, in a case where the quality of received signal of the TV broadcast signal received by one antenna is lower than the threshold value during ordinary operation (For example, refer to Japanese Patent Specification (Laid Open) No. 2005-217849), has been suggested.

SUMMARY OF THE INVENTION

The antenna system decides the optimal receiving direction by switching directional property of the antenna one by one during initial settings. Therefore, in a case where there are a large number of directions concerning the directional property of the antenna, the antenna system must decide the optimal receiving direction from among the large number of directions, for each channel. Thus, there is a problem in that initial settings take time.

The reason why there are a large number of directions is, that a case where sending tower that sends TV broadcast signal is interspersed has been assumed. However, in actual practice, sending tower is usually located in a group at some locations. Therefore, it is usual that the optimal receiving direction of the antenna is also located disproportionately at some locations. However, concerning the conventional antenna system, ingenuity such as providing order priority to the switching orders of the directional property of the antenna, was not conducted. Therefore, operation to decide the optimal receiving direction was poor in efficiency.

The present invention has been made to achieve an object to provide an antenna system and a television receiver provided with such antenna system, that is capable to decide the optimal receiving direction of the antenna efficiently.

In order to achieve the above object, one aspect reflecting the present invention is a television receiver comprising: an antenna that is capable to switch directional property when receiving a television broadcast signal; an initial settings section to conduct initial settings of an optimal receiving direction of the antenna for each channel; and an antenna system that sets directional property of the antenna to an optimal receiving direction that corresponds to a desired channel which is conducted with initial settings by the initial settings section when the desired channel is set, and receives a television broadcast signal that corresponds to the desired channel; wherein the initial settings section comprises: a switching section to switch directional property of the antenna sequentially when conducting initial settings of a first optimal receiving direction of the antenna that corresponds to one channel; a determination section to determine whether a first television broadcast signal that corresponds to the one channel is received by the antenna system or not, each time directional property of the antenna is switched by the switching section; a decision section to decide a direction of directional property of the antenna when it is determined that the first television broadcast signal that corresponds to the one channel is received by the antenna system by the determination section, as the first optimal receiving direction that corresponds to the one channel; and a storing section to store the direction that was decided as the first optimal receiving direction that corresponds to the one channel by the decision section, and number of decision times that the direction was decided as the optimal receiving direction, in correspondence with each other; wherein the switching section: switches directional property of the antenna sequentially from a receiving direction that have larger number of decision times which is stored in the storing section, until it is determined that the first television broadcast signal that corresponds to the one channel is received by the antenna system by the determination section; and switches directional property of the antenna to a receiving direction that is closest to present direction of directional property of the antenna, among a plurality of receiving directions that have the same number of decision times, in a case where there are plural receiving directions that have the same number of decision times among receiving direction stored in the storing section.

According to the present invention, directional property of the antenna can be switched sequentially when conducting initial settings of the optimal receiving direction of the antenna concerning one channel by the switching section provided to the initial settings section. In addition, it can be determined whether the television broadcast signal that corresponds to the one channel is received by the antenna system or not, each time directional property of the antenna is switched by the switching section, by the determination section provided to the initial settings section. Further, the direction of directional property of the antenna when it is determined that the television broadcast signal that corresponds to the one channel is received by the antenna system by the determination section, can be decided as the optimal receiving direction that corresponds to the one channel, by the decision section provided to the initial settings section. The receiving direction that was decided as the optimal receiving direction by the decision section and number of decision times that the receiving direction was decided as the optimal receiving direction, can be stored in correspondence with each other, by the storing section provided to the initial settings section. The switching section can switch directional property of the antenna sequentially from the receiving direction that have larger number of decision times, which is stored in the storing section, until it is determined that the television broadcast signal that corresponds to the one channel is received by the antenna system by the determination section. Meantime, in a case where there is a plurality of receiving directions that have the same number of decision times among receiving direction stored in the storing section, the switching section can also switch directional property of the antenna to the receiving direction that is closest to present direction of directional property of the antenna, among a plurality of receiving directions that have the same number of decision times.

That is, when deciding the optimal receiving direction of the antenna for one channel during initial settings, directional property of the antenna can be switched sequentially from the receiving direction that has larger number of decision times which it was decided as the optimal receiving direction until present, concerning the initial settings. Therefore, especially in a case where the optimal receiving direction of the antenna is located disproportionately at some locations, wasteful switching of the directional property of the antenna is prevented, thus the optimal receiving direction of the antenna can be decided efficiently.

In addition, in a case where there is a plurality of receiving directions with the same number of decision times, directional property of the antenna is switched to the receiving direction that is the closest to the present direction concerning the directional property of the antenna, among the plurality of receiving directions. Therefore, compared to a case where it is switched to a receiving direction that is far, time required for the receiving property to become stable is shortened, thus the optimal receiving direction of the antenna can be decided effectively.

According to a second aspect of the present invention, an antenna system comprises: an antenna that is capable to switch directional property when receiving a television broadcast signal; and an initial settings section to conduct initial settings of an optimal receiving direction of the antenna for each channel; wherein: the antenna system that sets directional property of the antenna to an optimal receiving direction that corresponds to a desired channel which is conducted with initial settings by the initial settings section when the desired channel is set, and receives a television broadcast signal that corresponds to the desired channel; the initial settings section comprises: a switching section to switch directional property of the antenna sequentially when conducting initial settings of a first optimal receiving direction of the antenna that corresponds to one channel; a determination section to determine whether a first television broadcast signal that corresponds to the one channel is received by the antenna system or not, each time directional property of the antenna is switched by the switching section; a decision section to decide a direction of directional property of the antenna when it is determined that the first television broadcast signal that corresponds to the one channel is received by the antenna system by the determination section, as the first optimal receiving direction that corresponds to the one channel; and a storing section to store the direction that was decided as the first optimal receiving direction that corresponds to the one channel by the decision section, and number of decision times that the direction was decided as the optimal receiving direction, in correspondence with each other; and the switching section switches directional property of the antenna sequentially from a receiving direction that have larger number of decision times which is stored in the storing section, until it is determined that the first television broadcast signal that corresponds to the one channel is received by the antenna system by the determination section.

According to the present invention, directional property of the antenna can be switched sequentially when conducting initial settings of the optimal receiving direction of the antenna concerning one channel by the switching section provided to the initial settings section. In addition, it can be determined whether the television broadcast signal that corresponds to the one channel is received by the antenna system or not, each time directional property of the antenna is switched by the switching section, by the determination section provided to the initial settings section. Further, the direction of directional property of the antenna when it is determined that the television broadcast signal that corresponds to the one channel is received by the antenna system by the determination section, can be decided as the optimal receiving direction that corresponds to the one channel, by the decision section provided to the initial settings section. The receiving direction that was decided as the optimal receiving direction by the decision section and number of decision times that the receiving direction was decided as the optimal receiving direction, can be stored in correspondence with each other, by the storing section provided to the initial settings section. The switching section can switch directional property of the antenna sequentially from the receiving direction that have larger number of decision times, which is stored in the storing section, until it is determined that the television broadcast signal that corresponds to the one channel is received by the antenna system by the determination section.

That is, when deciding the optimal receiving direction of the antenna for one channel during initial settings, directional property of the antenna can be switched sequentially from the receiving direction that has larger number of decision times which it was decided as the optimal receiving direction until present, concerning the initial settings. Therefore, especially in a case where the optimal receiving direction of the antenna is located disproportionately at some locations, wasteful switching of the directional property of the antenna is prevented, thus the optimal receiving direction of the antenna can be decided efficiently.

BREIF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

DETAILED DESCRIPTION OF THE PREFERRED EMBODIMENT

Figure 1:
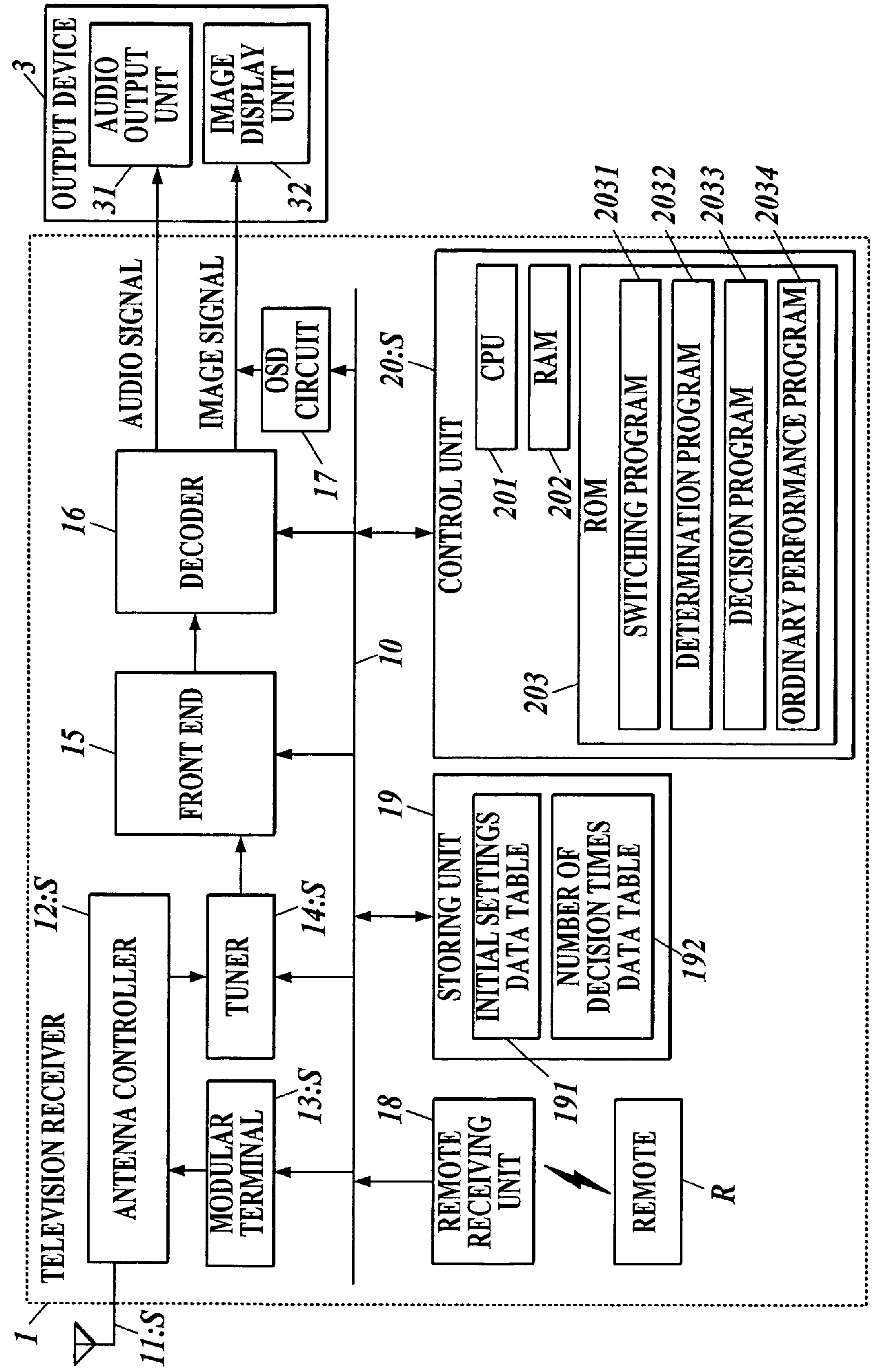
FIG. 1 is a block diagram showing a functional structure of a television receiver according to the present invention;.

A preferred embodiment of the television receiver according to the present invention will be described with reference to figures. Here, scope of the invention is not limited to the examples shown in figures.

Structure of Television Receiver

First of all, structure of television receiver 1 is described with reference to FIG. 1.

The television receiver 1 is provided with an antenna system S, and is connected to an output device 3, for example.

In particular, the television receiver 1 is structured with a modular terminal 13, a tuner 14, a front end 15, a decoder 16, an OSD circuit 17, a remote receiving unit 18, a memory unit 19, a control unit 20, and the like. Each unit is connected through a bus 10.

In addition, the television receiver 1 is provided with an antenna controller 12 having an antenna 11. Here, the antenna controller 12 is connected with the modular terminal 13, the tuner 14, and the like.

The television receiver 1 is provided with a remote controller R (hereinafter referred to as "remote R") designed for the television receiver 1, which is capable to communicate with the remote receiving unit 18.

The television receiver 1 is connected with an output device 3 having an audio output unit 31, image display unit 32, and the like, through the decoder 16.

Here, the antenna system S is structured with the antenna 11, the antenna controller 12, the modular terminal 13, the tuner 14, the control unit 20, and the like, for example.

The antenna 11 receives a television broadcast signal (hereinafter referred to as "TV broadcast signal") of digital form, which is compressed and sent from a sending tower or the like of a broadcast station, for example. The antenna 11 is capable to switch directional property when receiving a TV broadcast signal, for example.

In particular, the antenna 11 has a plurality of directional properties, and when directional property is switched to set to one direction among the plurality of directional properties by the antenna controller 12, the antenna 11 shows higher sensitivity to the TV broadcast signal from the one direction, than TV broadcast signal from other directions.

Figures 2, 3, 4:
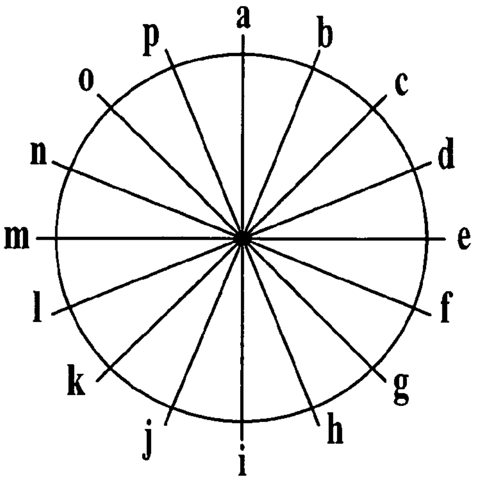
FIG. 2 is a view showing a directional property of an antenna shown in FIG. 1.
FIG. 3 is a view showing a data structure of an initial settings data table shown in FIG. 1.
FIG. 4 is a view showing a number of decision times data table shown in FIG. 1.

Here, direction of the directional property of the antenna 11 is in 16 directions (direction-a through direction-p) as shown in FIG. 2.

The antenna controller 12 switches and sets the directional property of the antenna 11 in accordance with a directional property switching signal (described later) which is outputted from the modular terminal 13, for example.

Further, the antenna controller 12 outputs the TV broadcast signal received by the antenna 11 to the tuner 14, for example.

The modular terminal 13 outputs the directional property switching signal to switch the directional property of the antenna 11, in accordance with a control signal inputted from the control unit 20, to the antenna controller 12.

The tuner 14 receives a TV broadcast signal that exists in a frequency band that corresponds to one channel, among the TV broadcast signals that are received by the antenna 11 and outputted from the antenna controller 12, in accordance with the control signal inputted from the control unit 20. Then, the received TV broadcast signal is outputted to the front end 15.

In particular, by tuning the TV broadcast signal received by the antenna 11 to a frequency band (frequency band that corresponds to one channel) that is set by the control unit 20, the tuner 14 receives the TV broadcast signal that corresponds to the one channel.

Here, channel that is receivable by the antenna system S is channels 2 through 69, for example.

The front end 15 converts the TV broadcast signal outputted from the tuner 14 into an intermediate frequency signal, and outputs to the decoder 16, in accordance with the control signal inputted from the control unit 20.

The decoder 16 decodes the TV broadcast signal, by applying processing that corresponds to a predetermined file format (for example, MPEG-2 (Moving Picture Experts Group phase 2) format and the like) to the TV broadcast signal outputted from the front end 15, in accordance with a control signal inputted from the control unit 20. Then the decoded TV broadcast signal is separated into an audio signal and an image signal, and the audio signal is outputted to an audio output unit 31 of the output device 3 as well as the image signal is outputted to an image display unit 32 of the output device 3.

The audio output unit 31 of the output device 3 is a speaker equipment for example, and outputs audio that corresponds to audio data in accordance with audio signal outputted from the decoder 16.

The image display unit 32 of the output device 3 is a liquid crystal display equipment for example, and displays image that corresponds to image data in accordance with image signal outputted from the decoder 16, image that corresponds to image data in accordance with image signal synthesized from an OSD display signal (described later) by the OSD circuit 17, or the like.

The OSD circuit 17 synthesizes the OSD display signal, to conduct a predetermined on screen display (hereinafter referred to as "OSD") on the image display unit 32 of the output device 3, into the image signal outputted to the image display unit 32 of the display device 3 from the decoder 16, in accordance with a control signal inputted from the control unit 20.

The remote receiving unit 18 receives various kinds of signals sent from the remote R, and outputs various kinds of data that correspond to the various signals to the control unit 20.

The remote R is operated by a user for example, and sends a signal that corresponds to the operation to the remote receiving unit 18.

The memory unit 19 is structured with a magnetic recording medium, an optical recording medium, or a semiconductor memory, for example.

In particular, as shown in FIG. 1, an initial settings data table 191, a number of decision times data table 192, and the like are stored in the memory unit 19.

The initial settings data table 191 stores a channel that is receivable by the antenna system S in correspondence with an optimal receiving direction decided by the CPU 201 (described later) that executed the decision program 2033.

In particular, the initial settings data table 191 has, as shown in FIG. 3, a "channel" storing region **191*a* to store channel that is receivable by the antenna system S, an "optimal receiving direction" storing region 191*b* to store optimal receiving direction decided by the CPU 201 (described later) that executed the decision program 2033**, and the like.

The number of decision times data table 192, as an initial settings section and a storing section, stores a receiving direction decided as the optimal receiving direction by the CPU 201 (described later) that executed the decision program 2033, and number of decision times that the receiving direction was decided as the optimal receiving direction, in correspondence with each other.

In particular, the number of decision times data table 192 has, as shown in FIG. 4, a "receiving direction" storing region 192*a* to store the receiving direction that was decided as the optimal receiving direction by the CPU 201 (described later) that executed the decision program 2033, a "number of decision times" storing region 192*b* to store a number of decision times which the receiving direction was decided as the optimal receiving direction, and the like.

The control unit 20 is provided with, as shown in FIG. 1, a CPU (Central Processing Unit) 201, a RAM (Random Access Memory) 202, a ROM (Read Only Memory) 203, and the like.

The CPU 201 conducts various kinds of control operations in accordance with various kinds of processing programs for the television receiver 1 stored in the ROM 203.

The RAM 202 is provided with a program storing region to spread processing program that is executed by the CPU 201, and a data storing region to store inputted data and processing result that is generated when the processing program is executed.

The ROM 203 stores a system program that is executable by the television receiver 1, various kinds of processing programs executable by the system program, data used when executing these various kinds of processing programs, various kinds of result data obtained by conducting calculation processing by the CPU 201, and the like. Here, the program is stored in the ROM 203 in a form of program code, which is readable by the computer.

In particular, the ROM 203 stores a switching program 2031, a determination program 2032, a decision program 2033, an ordinary performance program 2034, and the like.

The switching program 2031 makes the CPU 201 realize a function to switch directional property of the antenna 11 sequentially, through the modular terminal 13 and the antenna controller 12, when conducting initial settings of the optimal receiving direction of the antenna 11 of one channel for each channel.

In particular, when conducting initial settings (specifically, when conducting auto scan processing (described later) among the initial settings processing), the CPU 201 switches the directional property of the antenna 11 sequentially from the receiving direction that has higher number in number of decision times stored in the number of decision times data table 192, until it is determined that a TV broadcast signal that corresponds to the one channel is received by the antenna system S, by the CPU 201 (described later) that executed the determination program 2032. Meanwhile, in a case where there is a plurality of receiving directions with the same number of decision times among the receiving direction stored in the number of decision times data table 192, directional property of the antenna 11 is switched to a receiving direction that is the closest to the present direction concerning the directional property of the antenna 11, among the plurality of receiving directions that have the same number of decision times. Here, the CPU 201 does not switch the directional property of the antenna 11 to the direction, that has once been switched to again, until it is determined that the TV broadcast signal that corresponds to the one channel is received by the antenna system S, by the CPU 201 (described later) that executed the determination program 2032.

More specifically, in a case where there is a plurality of receiving directions (for example, three directions of "b-direction", "g-direction", and "j-direction") that have the same number of decision times, among the receiving direction stored in the number of decision times data table 192, the CPU 201 switches the directional property of the antenna 11 to a receiving direction that is the closest ("b-direction") to the present direction (for example, "a-direction") concerning the directional property of the antenna 11, among the plurality of receiving directions that have the same number of decision times. Then, when it is determined that the TV broadcast signal is not received in the "b-direction" by the CPU 201 (described later) that executed the determination program 2032, the CPU 201 switches the directional property of the antenna 11 to a receiving direction that is the closest ("g-direction") to the present direction ("b-direction") concerning the directional property of the antenna 11, among the plurality of receiving directions that have the same number of decision times, other than the "b-direction" ("g-direction" and "j-direction"). Then, when it is determined that the TV broadcast signal is not received in the "g-direction" by the CPU 201 (described later) that executed the determination program 2032, the CPU 201 switches the directional property of the antenna 11 to the "j-direction". Here, in a case where there are two receiving directions that are the closest to the present direction concerning the directional property, the CPU 201 switches the direction of directional property of antenna 11 to a receiving direction that is in the predetermined direction (for example, in a clockwise direction).

Here, the initial settings section and the switching section are structured with a CPU 201 that executed the switching program 2031, the modular terminal 13, the antenna controller 12, and the like.

The determination program 2032 makes the CPU 201 realize a function to determine whether the TV broadcast signal that corresponds to the one channel is received by the antenna system S or not, each time the directional property of the antenna 11 is switched by the CPU 201 that executed the switching program 2031.

The CPU 201 serves as the initial settings section and the determination section by executing the determination program 2032.

The determination program 2033 makes the CPU 201 realize a function to decide the direction of the directional property of the antenna 11, when it is determined that the TV broadcast signal that corresponds to the one channel is received by the antenna system S by the CPU 201 that executed the determination program 2032, as the optimal receiving direction that corresponds to the one channel.

Then, when the optimal receiving direction that corresponds to the one channel is decided, the CPU 201 stores the decided optimal receiving direction in correspondence with the one channel, in the initial settings data table 191. At the same time, the CPU 201 updates the number of decision times of the number of decision times data table 192, by adding "1" to the number of decision times that corresponds to the receiving direction that is decided as the optimal receiving direction among the number of decision times stored in the number of decision times data table 192. Here, in a case where it is determined by the CPU 201 that executed the determination program 2032, that the TV broadcast signal that corresponds to the one channel is not received, even though the directional property of the antenna 11 is switched to all the 16 directions by the CPU 201 that executed the switching program 2031, the CPU 201 cannot decide the optimal receiving direction that corresponds to the one channel, and the optimal receiving direction that corresponds to the one channel is left to be set to default.

The CPU 201 serves as the initial settings section and the decision section by executing the decision program 2033.

The ordinary performance program 2034 is initialized by the CPU 201 that executed the switching program 2031, the determination program 2032, and the decision program 2033, in a case where a channel desired by a user is selected by an operation or the like through the remote R by the user. In addition, the ordinary performance program 2034 makes the CPU 201 realize a function to set the directional property of the antenna by switching it to the optimal receiving direction that corresponds to the channel desired by the user, which is stored in the initial settings data table 191, and a function to receive the TV broadcast signal that corresponds to the channel desired by the user.

[Auto Scan Processing by the Television Receiver]

Figure 5:
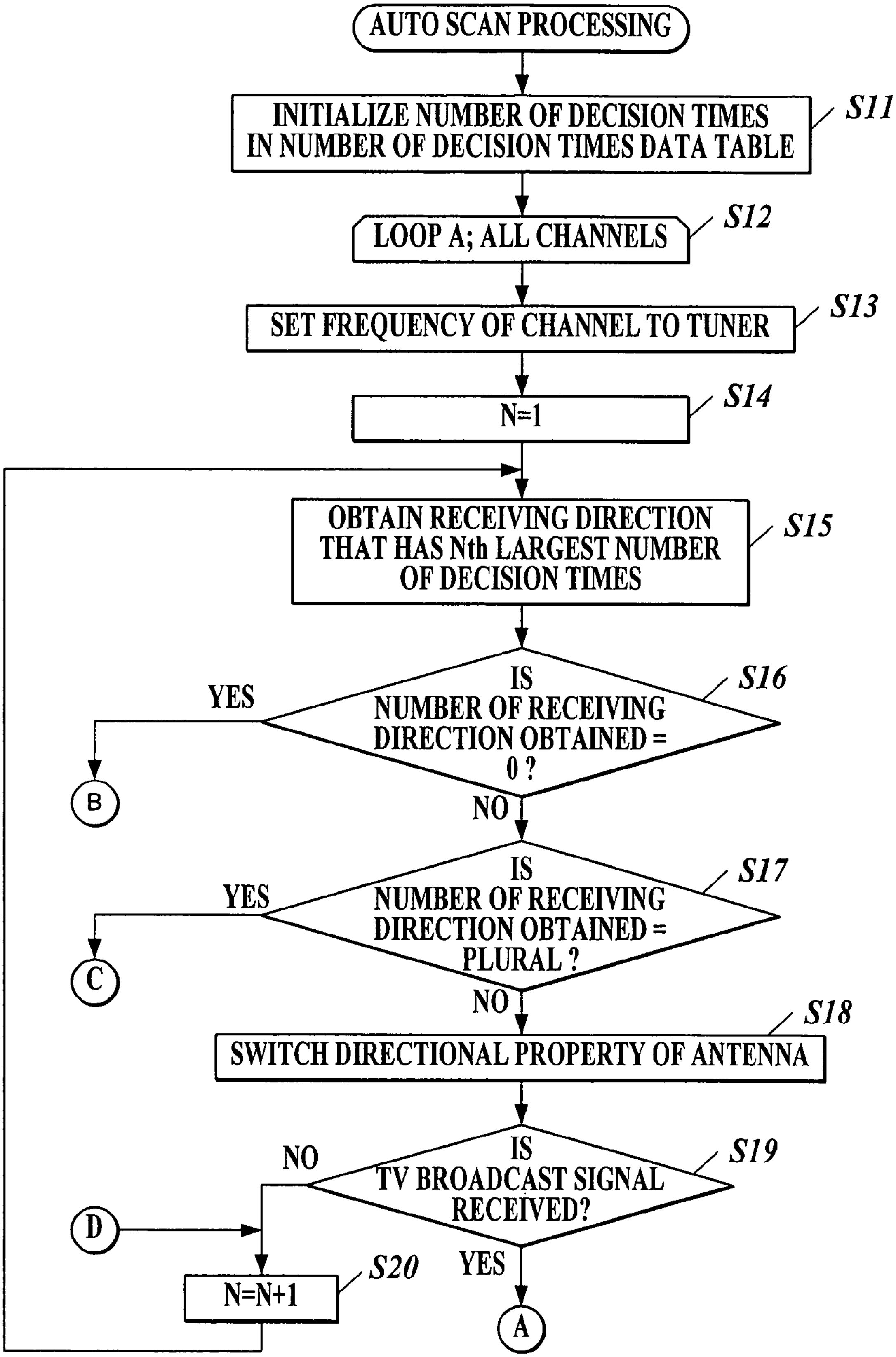
FIG. 5 is a flow chart to explain a first processing relating to an auto scan of a channel by the television receiver according to the present invention.
Figure 6:
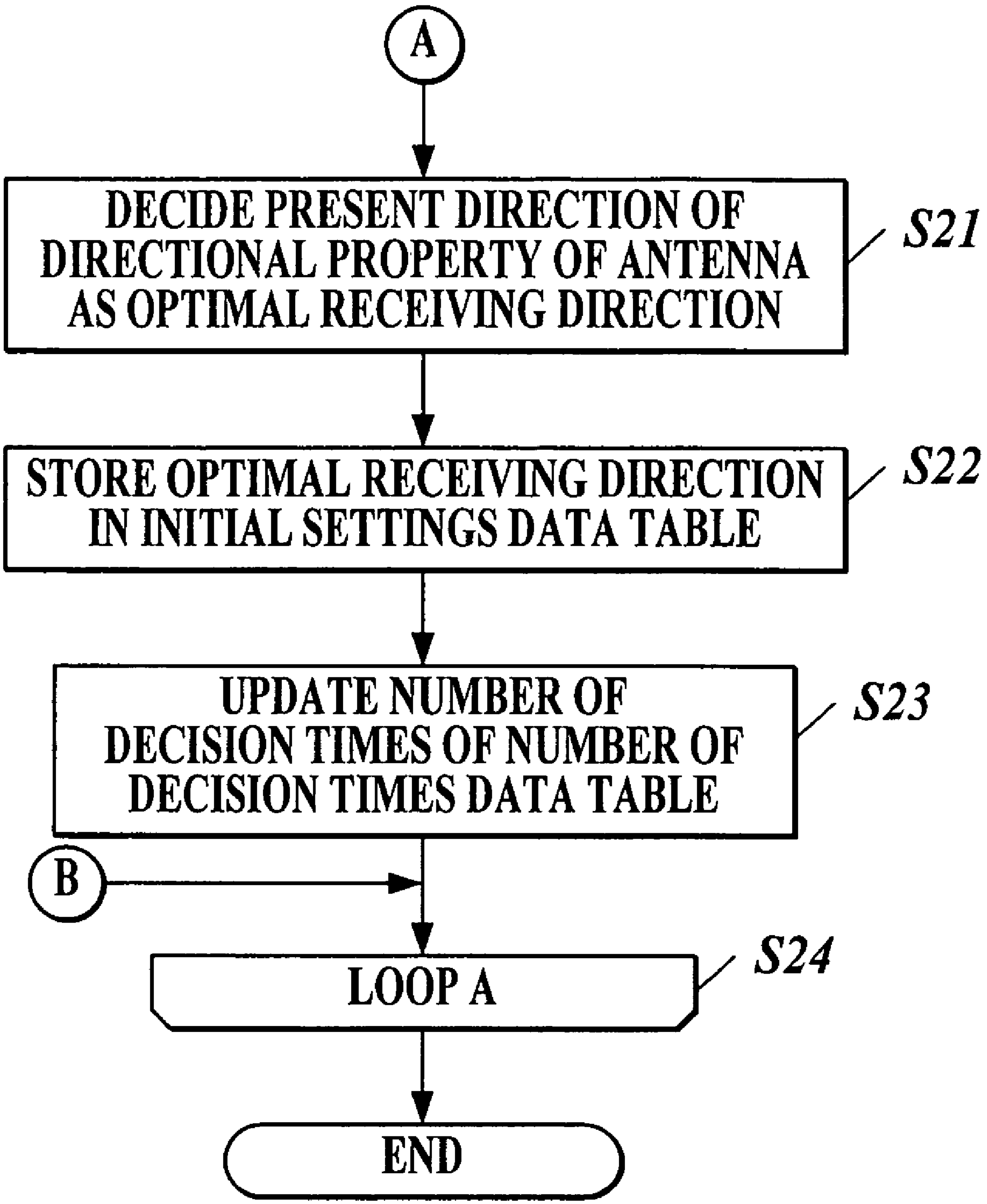
FIG. 6 is a flow chart to explain a second processing relating to the auto scan of a channel by the television receiver according to the present invention.
Figure 7:
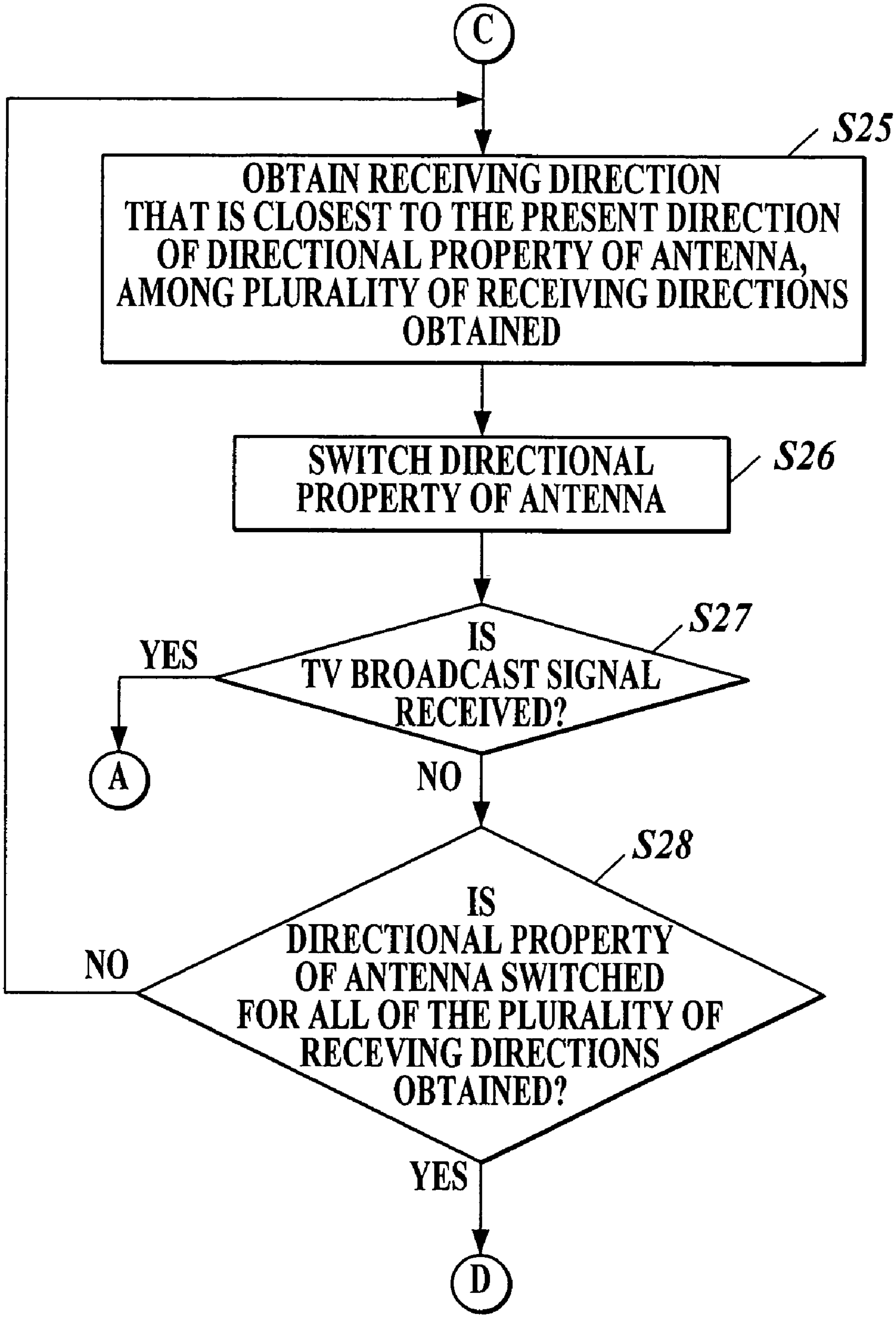
FIG. 7 is a flow chart to explain a third processing relating to the auto scan of a channel by the television receiver according to the present invention.

Next, processing relating to auto scan of channel by the television receiver 1 is described with reference to flow charts of FIGS. 5 through 7.

Here, the auto scan processing is one of the processing that relates to initial settings by the television receiver 1 (initial settings processing), for example.

First of all, the CPU 201 initializes the number of decision times by storing "0" to all the "number of decision times" storing region 192*b* of the number of decision times data table 192 (step S11).

Next, the CPU 201 conducts processing of loop A concerning all the channels that are receivable by the antenna system S (steps S12 through S24).

In particular, in the processing of loop A for one channel, the CPU 201 first sets a frequency number of the one channel to tuner 14 (step S13), and sets 1 to "N" (step S14).

Subsequently, the CPU 201 executes the switching program 2031, and obtains a receiving direction which has Nth largest number of decision times, among the receiving direction stored in the number of decision times data table 192 (step S15).

Next, the CPU 201 determines whether the number of receiving direction obtained in step 15 is 0 or not, that is, whether receiving determination of TV broadcast signal is completed for all the receiving directions or not (step S16).

In step S16, when it is determined that the number of receiving direction obtained in step S15 is 0 (step S16; Yes), the CPU 201 moves on to processing of step S24.

On the other hand, in step S16, when it is determined that the number of receiving direction obtained in step S15 is not 0 (step S16; No), the CPU 201 determines whether the number of receiving direction obtained in step S15 is in plural or not (step S17).

In step S17, when it is determined that the number of receiving direction obtained in step S15 is not plural (step S17; No), the CPU 201 switches the directional property of the antenna 11 to the receiving direction obtained in step S15 (step S18).

Subsequently, the CPU 201 executes the determination program 2032, and determines whether the TV broadcast signal that corresponds to the one channel is received by the antenna system S (tuner 11) or not (step S19).

In step S19, when it is determined that the TV broadcast signal that corresponds to the one channel in not received by the antenna system S (tuner 11) (step S19; No), the CPU 201 sets the "N" to "N+1" (step S20), and repeats the processing from step S15.

On the other hand, in step S19, when it is determined that the TV broadcast signal that corresponds to the one channel is received by the antenna system S (tuner 11) (step S19; Yes), the CPU 201 executed the decision program 2033, and decides the present direction of the directional property of the antenna 11 as the optimal receiving direction that corresponds to the one channel (step S21).

Subsequently, the CPU 201 stores the optimal receiving direction decided in step S21 in correspondence with the one channel, in the initial settings data table 191 (step S22).

Next, the CPU 201 updates the number of decision times in the number of decision times data table 192 (step S23) by adding "1" to the number of decision times that corresponds to the receiving direction which is decided as the optimal receiving direction in step S21, among the number of decision times stored in the number of decision times data table 192. Thus, the processing of loop A for the one channel is completed (step S24).

In addition, in step S17, when it is determined that the number of receiving direction obtained in step S15 is plural (step S17; Yes), the CPU 201 obtains a receiving direction that is the closest to the present direction of the antenna 11 concerning directional property, among the plurality of receiving directions obtained in step S15 (step S25).

Here, concerning the processing of loop A for the one channel, in a case where processing of step S25 has been conducted for a number of times, the CPU 201 obtains a receiving direction that is the closest to the present direction of the antenna 11 concerning directional property, among the plurality of receiving directions obtained in S15, other than the receiving directions that was obtained in step S25.

Subsequently, the CPU 201 switches the directional property of the antenna 11 to the receiving direction that was obtained in step S25 (step S26).

Next, the CPU 201 executes the determination program 2032, and determines whether the TV broadcast signal that corresponds to the one channel was received by the antenna system S (tuner 11) or not (step S27).

In step S27, when it is determined that the TV broadcast signal that corresponds to the one channel was received by the antenna system S (tuner 11) (step S27; Yes), the CPU 201 moves on to processing of step S21 (refer to FIG. 6).

On the other hand, in step S27, when it is determined that the TV broadcast signal that corresponds to the one channel was not received by the antenna system S (tuner 11) (step S27; No), the CPU 201 determines whether the directional property of the antenna 11 has been switched to all of the plurality of receiving directions obtained in step S15 or not (step S28).

In step S28, when it is determined that directional property of the antenna 11 has not been switched to all of the plurality of receiving directions obtained in step S15 (step S28; No), the CPU 201 repeats the processing from step S25.

On the other hand, in step S28, when it is determined that directional property of the antenna 11 has been switched to all of the plurality of receiving directions obtained in step S15 (step S28; Yes), the CPU 201 moves on to processing of step S20 (refer to FIG. 1).

Then, when the processing of loop A is completed for all of the channels that are receivable by the antenna system S (step S24), the CPU 201 completes the present processing.

Further, when the processing relating to the initial settings by the television receiver 1 that includes the auto scanning processing, the CPU 201 becomes capable to execute the ordinary operation program 2034, or the like.

As described above, the television receiver 1 according to the present invention includes an antenna 11 that is capable to switch directional property when receiving a TV broadcast signal, a switching program 2031 to conduct initial settings of optimal receiving direction of the antenna 11 for each channel, a CPU 201 that executes determination program 2032 and decision program 2033. In a case where a user selects a desired channel through operation or the like of remote R by the user, directional property of the antenna 11 is set by switching to the optimal receiving direction that corresponds to the channel desired by the user, which has been conducted initial settings and has been stored in the initial settings data table 191. The television receiver 1 further comprises an antenna system S that receives a TV broadcast signal that corresponds to the channel desired by the user. In a case where initial settings for the optimal receiving direction of the antenna concerning one channel is conducted by the CPU 201 that executed the switching program 2031, directional property of the antenna 11 can be switched sequentially through the modular terminal 13 and the antenna controller 12. Further, it can be determined whether a TV broadcast signal that corresponds to the one channel is received by the antenna system S or not, by the CPU 201 that executed the determination program 2032, each time the directional property of the antenna is switched by the CPU 201 that executed the switching program 2031. In addition, the direction of the directional property of the antenna 11, in which it was determined by the CPU 201 which executed the determination program 2032 that the TV broadcast signal that corresponds to the one channel is received by the antenna system S, is decided as the optimal receiving direction that corresponds to the one channel by the CPU 201 that executed the decision program 2033. The receiving direction that was decided as the optimal receiving direction by the CPU 201 that executed the decision program 2033 and the number of decision times the receiving direction was decided as the optimal receiving direction are stored corresponding with each other by the number of decision times data table 192. Then, the CPU 201 that executed the switching program 2031 switches the directional property of the antenna 11 until it is determined by the CPU 201 that executed the determination program 2032 that the TV broadcast signal that corresponds to the one channel is received by the antenna system S, sequentially from the receiving direction that has larger number of decision times stored in the number of decision times data table 192. In addition, in a case where there is a plurality of receiving directions that have the same number of decision times among the receiving directions stored in the number of decision times data table 192, directional property of the antenna 11 can be switched to a receiving direction which is the closest to the present direction concerning the directional property of the antenna 11, among the plurality of receiving directions that have the same decision number.

That is, when deciding the optimal receiving direction of the antenna 11 for one channel while initial settings, directional property of the antenna 11 can be switched sequentially from the receiving direction that has larger number of decision times, which was decided as the optimal receiving direction until present, concerning the initial settings. Therefore, especially in a case where the optimal receiving direction of the antenna 11 is located disproportionately at some locations, wasteful switching of the directional property of the antenna 11 is prevented, thus the optimal receiving direction of the antenna 11 can be decided efficiently.

In addition, in a case-where there is a plurality of receiving directions with the same number of decision times, directional property of the antenna 11 is switched to the receiving direction that is the closest to the present direction concerning the directional property of the antenna 11, among the plurality of receiving directions. Therefore, compared to a case where it is switched to a receiving direction that is far, time required for the receiving property to become stable is shortened, thus the optimal receiving direction of the antenna 11 can be decided effectively.

Here, the present invention is not limited to the aforementioned embodiments, and modification can be made arbitrarily as long as it does not deviate the scope of the invention.

For example, the switching order of the directional property of the antenna 11 by the CPU 201 that executed the switching program 2031 is not limited to the present embodiment. Directional property of the antenna 11 may be switched to a receiving direction that has the largest number of decision times which is stored in the number of decision times data table 192, among the receiving directions that are located in a predetermined area from the present direction of the directional property of the antenna 11, until it is determined that the TV broadcast signal that corresponds to the one channel is received by the antenna system S, by the CPU 201 that executed the determination program 2032. In addition, in a case where there are a plurality of receiving directions that have the same number of decision times among the receiving directions stored in the number of decision times data table 192, the directional property of the antenna 11 may be switched to a receiving direction which is the closest to the present direction concerning the directional property of the antenna 11. Also in this case, the CPU 201 that executed the switching program 2031 does not switch the directional property of the antenna 11 to the direction, that has once been switched to again, until it is determined that the TV broadcast signal that corresponds to the one channel is received by the antenna system S, by the CPU 201 that executed the determination program 2032. In a case where there are two receiving directions that are the closest to the present direction of the directional property, the CPU 201 switches the direction of directional property of antenna 11 to a receiving direction that is in the predetermined direction (for example, in a clockwise direction).

TV broadcast signal of digital form was received by the antenna 11, however, TV broadcast signal of analog form may be received by the antenna 11, or TV broadcast signal of analog and digital form may be received.

The entire disclosure of Japanese Patent Application No. Tokugan 2005-377315 filed on Dec. 28, 2005 including specification, claims, drawings and summary are incorporated herein by reference in its entirety.

What is claimed is:

1. A television receiver comprising:

an antenna that is capable to switch directional property when receiving a television broadcast signal;

an initial settings section to conduct initial settings of an optimal receiving direction of the antenna for each channel; and an antenna system that sets directional property of the antenna to an optimal receiving direction that corresponds to a desired channel which is conducted with initial settings by the initial settings section when the desired channel is set, and receives a television broadcast signal that corresponds to the desired channel;

wherein the initial settings section comprises:

a switching section to switch directional property of the antenna sequentially when conducting initial settings of a first optimal receiving direction of the antenna that corresponds to one channel;

a determination section to determine whether a first television broadcast signal that corresponds to the one channel is received by the antenna system or not, each time directional property of the antenna is switched by the switching section;

a decision section to decide a direction of directional property of the antenna when it is determined that the first television broadcast signal that corresponds to the one channel is received by the antenna system by the determination section, as the first optimal receiving direction that corresponds to the one channel; and a storing section to store the direction that was decided as the first optimal receiving direction that corresponds to the one channel by the decision section, and number of decision times that the direction was decided as the optimal receiving direction, in correspondence with each other;

wherein the switching section:

switches directional property of the antenna sequentially from a receiving direction that have larger number of decision times which is stored in the storing section, until it is determined that the first television broadcast signal that corresponds to the one channel is received by the antenna system by the determination section; and switches directional property of the antenna to a receiving direction that is closest to present direction of directional property of the antenna, among a plurality of receiving directions that have the same number of decision times, in a case where there are plural receiving directions that have the same number of decision times among receiving direction stored in the storing section.

2. An antenna system comprising:

an antenna that is capable to switch directional property when receiving a television broadcast signal; and an initial settings section to conduct initial settings of an optimal receiving direction of the antenna for each channel; wherein:

the antenna system that sets directional property of the antenna to an optimal receiving direction that corresponds to a desired channel which is conducted with initial settings by the initial settings section when the desired channel is set, and receives a television broadcast signal that corresponds to the desired channel;

the initial settings section comprises:

a switching section to switch directional property of the antenna sequentially when conducting initial settings of a first optimal receiving direction of the antenna that corresponds to one channel;

a determination section to determine whether a first television broadcast signal that corresponds to the one channel is received by the antenna system or not, each time directional property of the antenna is switched by the switching section;

a decision section to decide a direction of directional property of the antenna when it is determined that the first television broadcast signal that corresponds to the one channel is received by the antenna system by the determination section, as the first optimal receiving direction that corresponds to the one channel; and a storing section to store the direction that was decided as the first optimal receiving direction that corresponds to the one channel by the decision section, and number of decision times that the direction was decided as the optimal receiving direction, in correspondence with each other; and the switching section switches directional property of the antenna sequentially from a receiving direction that have larger number of decision times which is stored in the storing section, until it is determined that the first television broadcast signal that corresponds to the one channel is received by the antenna system by the determination section.

* * * * *